(12) United States Patent
Kashihara et al.

(10) Patent No.: US 6,668,116 B2
(45) Date of Patent: Dec. 23, 2003

(54) ARRAYED WAVEGUIDE GRATING TYPE OPTICAL MULTIPLEXER/DEMULTIPLEXER

(75) Inventors: Kazuhisa Kashihara, Chiyoda-ku (JP); Kazutaka Nara, Chiyoda-ku (JP); Yoshinobu Nekado, Chiyoda-ku (JP); Tunetoshi Saito, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 345 days.

(21) Appl. No.: 09/904,847

(22) Filed: Jul. 16, 2001

(65) Prior Publication Data

US 2002/0025116 A1 Feb. 28, 2002

(30) Foreign Application Priority Data

Jul. 14, 2000 (JP) ........................................ 2000-214684

(51) Int. Cl.[7] .............................................. G08B 06/00
(52) U.S. Cl. ............................................ 385/37; 385/46
(58) Field of Search .............................. 385/14, 15, 37, 385/31, 46; 359/124, 125

(56) References Cited

U.S. PATENT DOCUMENTS

| | | | | |
|---|---|---|---|---|
| 6,571,034 B2 | * | 5/2003 | Bhagavatula | ................. 385/27 |
| 6,574,397 B2 | * | 6/2003 | Katayama et al. | ............. 385/46 |
| 6,591,034 B1 | * | 7/2003 | Albrecht et al. | ............... 385/24 |
| 6,597,841 B1 | * | 7/2003 | Dingel | ......................... 385/37 |
| 6,603,892 B1 | * | 8/2003 | Ticknor | ........................ 385/14 |

FOREIGN PATENT DOCUMENTS

| JP | 11-218639 | 8/1999 |
|---|---|---|
| JP | 2000-292632 | 10/2000 |

* cited by examiner

Primary Examiner—Khiem Nguyen
(74) Attorney, Agent, or Firm—Oblon, Spivak, McClelland, Maier & Neustadt, P.C.

(57) ABSTRACT

An arrayed waveguide grating type optical multiplexer/demultiplexer of the invention eliminates the temperature dependency of the light transmission center wavelengths and suppresses an increase in insertion loss with a simple configuration even under the conditions of high temperature and high humidity. A waveguide forming area comprising an optical input waveguide, a first slab waveguide, an arrayed waveguide formed of a plurality of channel waveguides arranged side by side having a different length each other, and a plurality of optical output waveguides connected one by one is formed on a substrate. For example, the first slab waveguide is separated at crossed separation planes that cross the path of light passing through the first slab waveguide. On the crossed separation planes, a matching grease is applied. A thin film member for covering the area arranged with the matching grease is disposed to suppress the evaporation of the matching grease.

1 Claim, 4 Drawing Sheets

Fig. 1
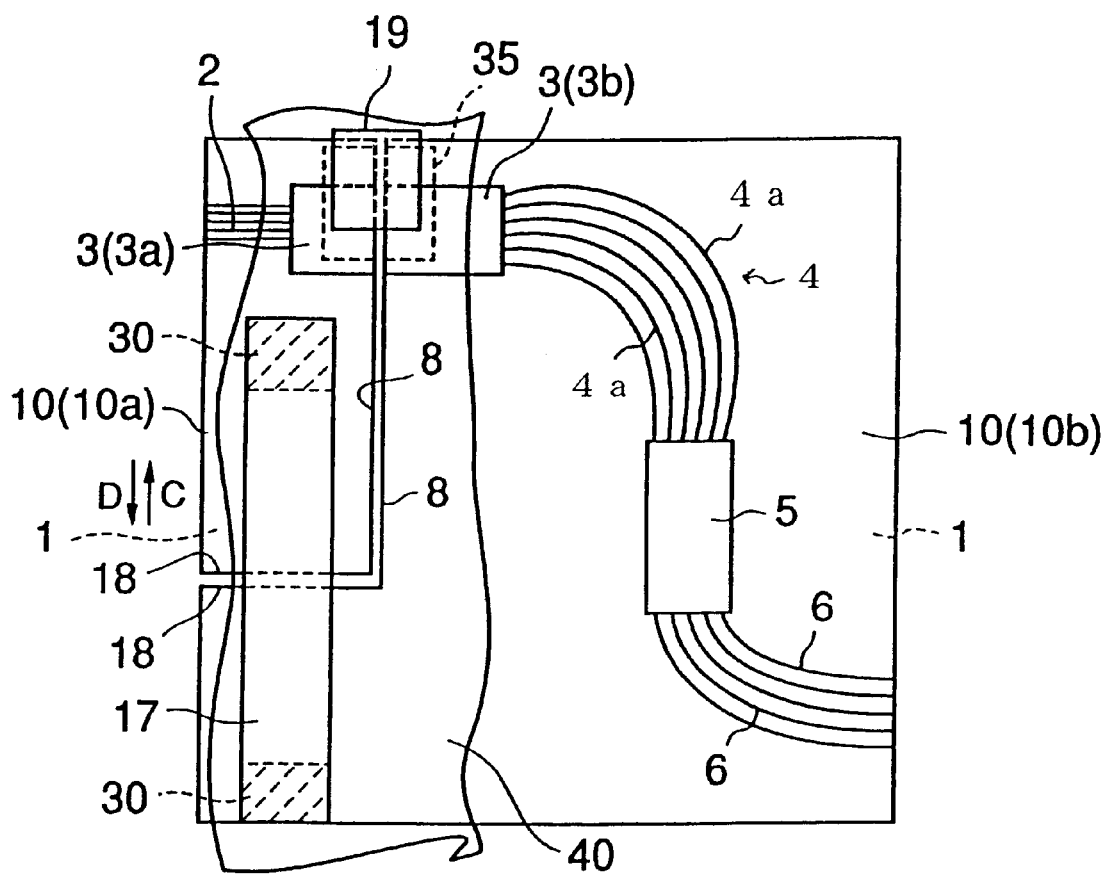
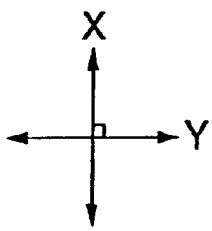

ARRAYED WAVEGUIDE GRATING TYPE OPTICAL MULTIPLEXER/DEMULTIPLEXER

BACKGROUND OF THE INVENTION

Recently, in optical communications, research and development of the optical wavelength division multiplexing (WDM) transmission systems have been conducted actively for the way to dramatically increase the transmission capacity thereof, and practical applications have been proceeding. The optical wavelength division multiplexing transmission systems are that a plurality of lights having a wavelength different from each other is wavelength-multiplexed and is transmitted, for example. In such optical wavelength division multiplexing transmission systems, lights need to be demultiplexed at every wavelength from the transmitted multiplexed lights on the light receiving side. On this account, the optical wavelength division multiplexing transmission systems are provided with optical devices that only transmit predetermined optical wavelengths.

One example of the optical devices is an arrayed waveguide grating (AWG) of a planar lightwave circuit (PLC), as shown in FIG. 4. The arrayed waveguide grating is that a waveguide forming area 10 made of silica-based glass is formed on a silicon substrate 1, for example. On the waveguide forming area 10 of the arrayed waveguide grating, the waveguide configuration as shown in the same drawing is formed of cores.

The waveguide configuration of the arrayed waveguide grating is formed to have one or more of optical input waveguides 2 arranged side by side; a first slab waveguide 3 connected to the output ends of the optical input waveguides 2; an arrayed waveguide 4 made of a plurality of channel waveguides 4a arranged side by side, the channel waveguides connected to the output end of the first slab waveguide 3; a second slab waveguide 5 connected to the output end of the arrayed waveguide 4; and a plurality of optical output waveguides 6 arranged side by side, the optical output waveguides connected to the output end of the second slab waveguide 5.

The channel waveguides 4a are a set for propagating lights that have been lead through the first slab waveguide 3 and are formed to have a different set length each other. The length of adjacent channel waveguides 4a are different from each other with ΔL. The channel waveguides 4a that constitute the arrayed waveguide 4 are generally disposed in multiple such as a hundred. However, in the same drawing, the number of the channel waveguides 4a is schematically depicted to simplify the drawing.

Additionally, optical output waveguides 6 are disposed corresponding to the number of signal light(s) having a different wavelength each other, the signal light(s) is (are) demultiplexed or multiplexed by the arrayed waveguide grating, for example. However, in the same drawing, the number of the optical input waveguides 2 and the optical output waveguides 6 is schematically depicted to simplify the drawing.

To the optical input waveguides 2, optical fiber(s) (not shown) on the transmitting side, for example, is (are) connected to lead wavelength multiplexed light. The light that have been lead to the first slab waveguide 3 through the optical input waveguides 2 spread by the diffraction effect thereof to enter each of the plurality of channel waveguides 4a, propagating through the arrayed waveguide 4.

The light that have propagated through the arrayed waveguide 4 reach the second slab waveguide 5 and are condensed at the optical output waveguides 6 to be outputted. The length of the entire channel waveguides 4a that constitute the arrayed waveguide 4 are different from each other. Thus, a shift is generated in the phase of the respective lights after propagating through the channel waveguides 4a, a phasefront of the lights is tilted according to this shifted amount and the positions at which the lights are condensed are determined by this tilted angle.

Therefore, the positions at which the lights having a different wavelength are condensed differ from each other, the optical output waveguides 6 are formed on each of the position at which the lights are condensed and thereby the lights having a different wavelength can be outputted from the different optical output waveguides 6 at every wavelength.

That is, the arrayed waveguide grating has the function of light demultiplexing where plurality of lights having different wavelengths are demultiplexed from the multiplexed light that is inputted from the optical input waveguides 2 and have a plurality of wavelengths different from each other.

Since the arrayed waveguide grating has the characteristic as described above, the arrayed waveguide grating can be used as an optical demultiplexer for the wavelength division multiplexing transmission. For example, as shown in FIG. 4, when wavelength multiplexed light having wavelengths $\lambda 1$, $\lambda 2$, $\lambda 3$, . . . and $\lambda n$ (n is an integer equal to or larger than 2 are inputted from one optical input waveguide 2, these lights spread at the first slab waveguide 3. Then, they reach the arrayed waveguide 4, pass through the second slab waveguide 5, are condensed at different positions according to wavelengths and enter the optical output waveguides 6 different from each other, as set forth. The lights entered to the respective optical output waveguides 6 pass through the respective optical output waveguides 6 and are outputted from the output end of the optical output waveguides 6.

An optical fiber (not shown) for outputting light is connected to the output end of each of the optical output waveguides 6 and thereby each of the lights having different wavelength is outputted. Furthermore, when the optical fiber is connected to each of the optical output waveguides 6 or optical input waveguides 2 mentioned above, an optical fiber array, for example, is prepared in which the connecting ends of optical fibers are arranged and fixed in a linear array. Then, this optical fiber array is fixed on the connecting end side of the optical output waveguides 6 or optical input waveguides 2 and the optical fiber is connected to the optical output waveguides 6 and the optical input waveguides 2.

The arrayed waveguide grating utilizes the principle of reciprocity (reversibility) of optical circuits and thereby it has the function of an optical multiplexer as well as the function of an optical demultiplexer. That is, as reverse to the FIG. 4, when a plurality of lights having different wavelength from each other is entered from each of the optical output waveguides 6, these lights pass through the propagation path inverse to that described above, are multiplexed by the arrayed waveguide 4 and are emitted from the optical input waveguide 2.

In such an arrayed waveguide grating, the wavelength resolution is in proportion to a difference in length (ΔL) of the adjacent channel waveguides 4a that constitute the arrayed waveguide 4, as set forth. Therefore, in the arrayed waveguide grating, the ΔL is designed large and thereby the optical multiplexing/demultiplexing of wavelength-multiplexed lights having a narrow wavelength spacing is made possible, which could not be realized by a conventional optical multiplexer/demultiplexer. For example the ΔL is made greater, a designed wavelength spacing for multiplexing/demultiplexing is designed 1 nm or less and thereby the function of multiplexing or demultiplexing a plurality of light signals having a wavelength spacing of 1 nm or less can be served. Thus, the function of multiplexing or demultiplexing a plurality of signal lights can be served, which is needed to realize the high-density optical wavelength division multiplexing transmission.

When the arrayed waveguide grating as described above is fabricated, for example, the flame hydrolysis deposition method (FHD) is first used, and an under cladding layer and a core layer are formed on a silicon substrate one by one. Then, photolithography is applied through a photomask depicted with the waveguide configuration of the arrayed waveguide grating. Subsequently, the reactive ion etching is used to transfer the pattern of the arrayed waveguide grating on the core layer. Then, the flame hydrolysis deposition method is again used to form an over cladding and thereby the arrayed waveguide grating is fabricated.

SUMMARY OF THE INVENTION

An arrayed waveguide grating type optical multiplexer/demultiplexer of the invention comprises:

one or more of optical input waveguides arranged side by side;

a first slab waveguide connected to output ends of the optical input waveguides;

an arrayed waveguide made of a plurality of channel waveguides arranged side by side, the channel waveguides connected to an output end of the first slab waveguide and the adjacent channel waveguides having a different set amount each other;

a second slab waveguide connected to an output end of the arrayed waveguide;

a plurality of optical output waveguides arranged side by side, the optical output waveguides connected to an output end of the second slab waveguide;

separation planes separating at least one of the first slab waveguide and second slab waveguide and crossing a path of light passing through the slab waveguide;

a slide moving member for slideable moving at least one side of the separated slab waveguides along the separation planes;

a refractive index matching agent arranged on the separation planes; and a thin film member for covering an area arranged with the refractive index matching agent.

BRIEF DESCRIPTION OF THE DRAWINGS

Exemplary embodiments of the invention will now be described in conjunction with drawings in which:

FIG. 1 is a main configurational diagram illustrating a first embodiment of the arrayed waveguide grating type optical multiplexer/demultiplexer in the invention;

DETAILED DESCRIPTION

Basically, the arrayed waveguide grating is mainly made of silica-based glass and thus the light transmission center wavelength of the arrayed waveguide grating is shifted depending on a temperature caused by the temperature dependency of this silica-based glass material. For example, in the arrayed waveguide grating configured by using conventional typical design values, this temperature dependency is so great that the shifted amount of the light transmission center wavelength becomes as much as 0.5 nm or more when the temperature change in the environment reaches at 50° C. or above. The value of the shifted amount of the light transmission center wavelength is a critical value for the arrayed waveguide grating that demultiplexes or multiplexes light(s) in a substantially narrow spacing of 1 nm or less.

Then, in order to solve the problem as set forth, an arrayed waveguide grating type optical multiplexer/demultiplexer capable of suppressing the temperature dependency of the light transmission center wavelength has been proposed. In addition, the detail of the proposal is described in Japanese Patent Applications (application numbers: Japanese Patent Application No. 370475/1999, filed on Dec. 27, 1999; Japanese Patent Application No. 176691/2000, filed on Jun. 13, 2000; and Japanese Patent Application No. 283806/2000, filed on Sep. 19, 2000).

Figure 3:
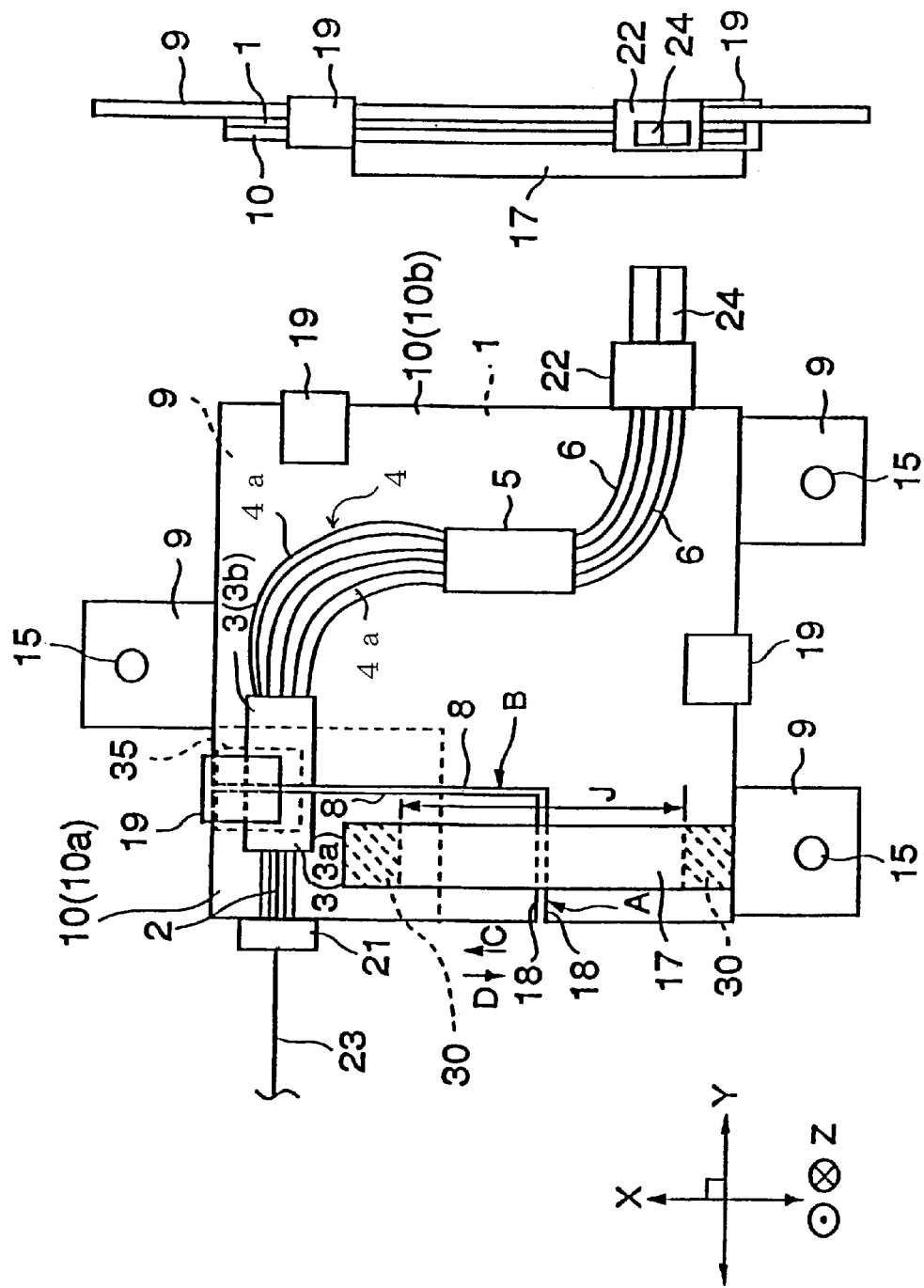
FIG. 3A is a plan view illustrating a configurational example of an arrayed waveguide grating type optical multiplexer/demultiplexer that has been proposed previously.
FIG. 3B is a side view illustrating the configurational example of the arrayed waveguide grating type optical multiplexer/demultiplexer that has been proposed previously.
Figure 4:
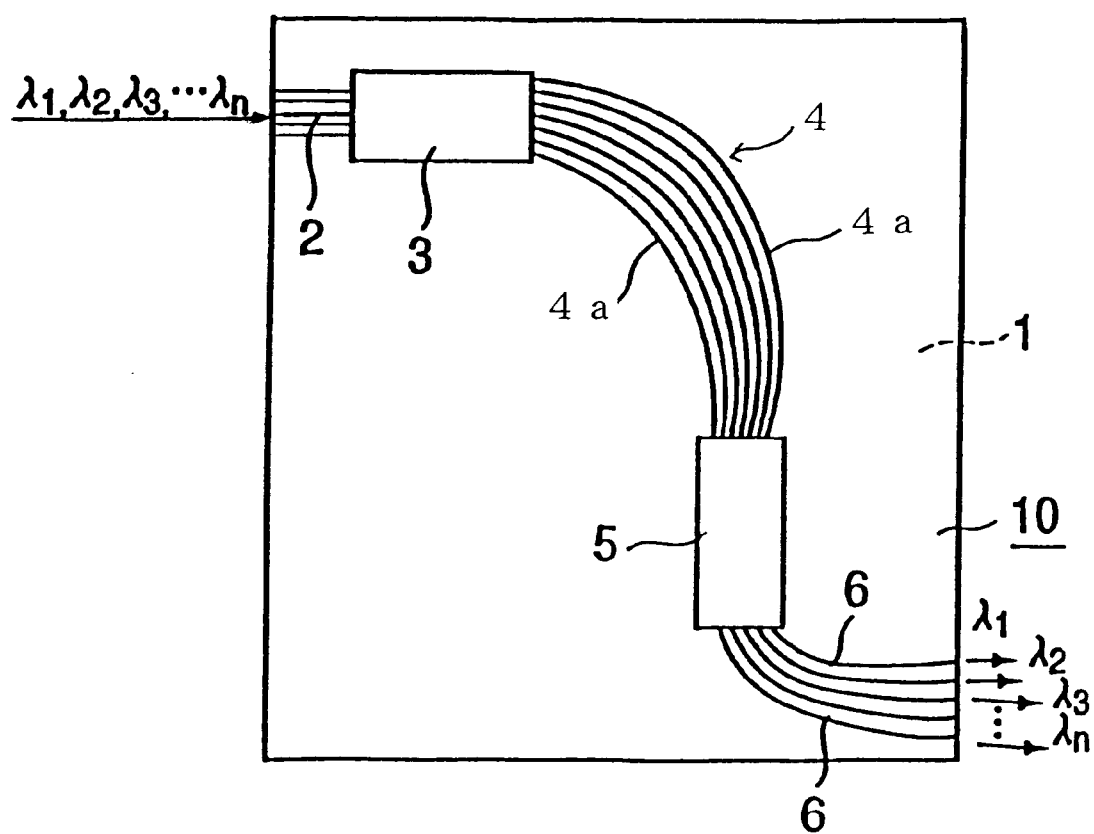
FIG. 4 is an illustration illustrating the configuration and the operation of a typical orthodox arrayed waveguide grating type optical multiplexer/demultiplexer.

The basic configuration of this proposed arrayed waveguide grating type optical multiplexer/demultiplexer is the configurations depicted in FIGS. 3A and 3B. In the arrayed waveguide grating type optical multiplexer/demultiplexer shown in FIGS. 3A and 3B, a waveguide forming area 10 made of silica-based glass is formed on a substrate 1. As similar to the conventional example, the waveguide forming area 10 has one or more of optical input waveguides 2; a first slab waveguide 3; an arrayed waveguide 4 made of a plurality of channel waveguides 4a arranged side by side; a second slab waveguide 5; and a plurality of optical output waveguides 6.

One of features of the arrayed waveguide grating shown in FIGS. 3A and 3B is in that the first slab waveguide 3 is separated by cutting, for example, at separation planes (crossed separation planes) 8 that separate at the plane (crossed plane) crossing the path of light passing through the first slab waveguide 3.

In addition, in FIGS. 3A and 3B, the crossed separation planes 8 are formed from one end side of the waveguide forming area 10 (the top end side of the drawing) toward the mid part on the waveguide forming area 10 in the X direction. Furthermore, non-crossed separation planes 18 that do not cross the first slab waveguide 3 are formed so as to connect with these crossed separation planes 8. The non-crossed separation planes 18 may be disposed not perpendicular to the crossed separation planes 8. The non-crossed separation planes 18 may be perpendicular to the crossed separation planes 8 although that is not a requirement; the drawing depicts a perpendicular form.

In the arrayed waveguide grating type optical multiplexer/demultiplexer shown in FIGS. 3A and 3B, the waveguide forming area 10 is separated into a first waveguide forming area 10a including a separated slab waveguide 3a on one side and a second waveguide forming area 10b including a separated slab waveguide 3 on the other side. The second waveguide forming area 10b is fixed to a base 9.

Moreover, a slide moving member 17 having a greater thermal expansion coefficient than that of the waveguide forming area 10 is disposed so as to cross over the first waveguide forming area 10a and the second waveguide forming area 10b. The slide moving member 17 is configured to move the first waveguide forming area 10a along the crossed separation planes 8 with respect to the second waveguide forming area 10b. Besides, this movement is conducted depending on the temperature of the arrayed waveguide grating type optical multiplexer/demultiplexer.

The slide moving member 17 set forth is formed of a copper plate having a thermal expansion coefficient of $1.65 \times 10^{-5}$ (1/K), for example. Underside the slide moving member 17, solders 30 are disposed at portions indicated by the shaded areas with diagonally dotted lines. Underside these solders 30, metal films (not shown in FIGS. 3A and 3B) are disposed. Through the metal films and the solders 30, the slide moving member 17 is fixed to the portions for fixing on the first waveguide forming area 10a and the second waveguide forming area 10b.

In the arrayed waveguide grating type optical multiplexer/demultiplexer shown in FIGS. 3A and 3B, when the temperature in the environment in which the arrayed waveguide grating type optical multiplexer/demultiplexer is used are changed, the slide moving member 17 expands or contracts. On this account, the first waveguide forming area 10a is slidably moved in the direction of an arrow C or D, along the crossed separation planes 8.

Here, a length J in FIG. 3A is set arbitrarily and thereby the amount of the slide movement is made to be a proper value that can compensate the temperature dependency of each of the light transmission center wavelengths accompanying the change in the temperature in the environment in which the arrayed waveguide grating is used. Thus, the movement along the crossed separation planes 8 is performed in the direction to reduce the temperature dependent variation of each of the light transmission center wavelengths of the arrayed waveguide grating. Accordingly, in the proposed arrayed waveguide grating, the temperature dependency of each of the light transmission center wavelengths accompanying the change in the temperature in the environment in which the arrayed waveguide grating is used is compensated.

Additionally, the first waveguide forming area 10a and the second waveguide forming area 10b are disposed with a spacing. Here, in the proposal described above, a refractive index matching agent is arranged in this spacing. In the arrayed waveguide grating type optical multiplexer/demultiplexer, this refractive index matching agent suppresses refraction in the crossed separation planes 8. Thus, it suppresses an increase in connection loss between the separated slab waveguides 3a and 3b and insertion loss.

Furthermore, in FIGS. 3A and 3B, 15 denotes holes for fixing the base 9 to a package (not shown), 19 denotes clips, 35 denotes a silicon plate, 21 and 22 denote optical fiber arrays, 23 and 24 denote an optical fiber.

However, in the arrayed waveguide grating type optical multiplexer/demultiplexer of the configuration as set forth, when a matching grease is used for the refractive index matching agent and a simple package that cannot at all protect a PLC from the influence of the external environment such as moisture, the matching grease applied to the crossed separation planes 8 might be evaporated under the environment of high temperature and high humidity. When this happens, the matching grease cannot function to stabilize insertion loss.

For example, when the inventor conducted the following humidity test on the arrayed waveguide grating type optical multiplexer/demultiplexer of the above-described configuration, the insertion loss of the arrayed waveguide grating type optical multiplexer/demultiplexer became 8.0 dB after the humidity test, which had been 4.5 dB before the humidity test. On the humidity test described above, the arrayed waveguide grating type optical multiplexer/demultiplexer of the above-described configuration was used, to which SC107, the product of Dow Corning Toray Silicon Co., Ltd., was applied as the matching grease. Then, this arrayed waveguide grating type optical multiplexer/demultiplexer was not allowed to stand for 336 hours under the environment of 85% relative humidity at 85° C., and the insertion loss at the 1.55 $\mu$m band was measured before and after the humidity test. Consequently, it was found that the insertion loss of the arrayed waveguide grating type optical multiplexer/demultiplexer was deteriorated after the humidity test, as described above.

To prevent the evaporation of the matching grease, the configuration is effective where the arrayed waveguide grating is housed inside a package such as a hermetic seal or oil seal. However, the inventor considered that without having such seal configurations, the simple package described above is used to fabricate an arrayed waveguide grating type optical multiplexer/demultiplexer, which can maintain the function of the matching grease under the environment of high temperature and high humidity.

The arrayed waveguide grating type optical multiplexer/demultiplexer in one aspect of the invention is an arrayed waveguide grating type optical multiplexer/demultiplexer capable of surely eliminating the temperature dependency of the light transmission center wavelength. In addition, this arrayed waveguide grating type optical multiplexer/demultiplexer is an arrayed waveguide grating type optical multiplexer/demultiplexer with a simple configuration capable of suppressing an increase in insertion loss even under the environment of high temperature and high humidity.

Hereafter, embodiments of the invention will be described in accordance with the drawings. However, in the following description of each of the embodiments, portions designated the same names as the conventional example or proposal are designated the same reference numerals and signs, omitting the overlapping explanation. FIG. 1 schematically depicts the main configuration of a first embodiment of the arrayed waveguide grating type optical multiplexer/demultiplexer in the invention, by way of a plan view.

The arrayed waveguide grating type optical multiplexer/demultiplexer of the first embodiment is configured almost the same as the proposed arrayed waveguide grating type optical multiplexer/demultiplexer shown in FIGS. 3A and 3B. As not shown in FIG. 1, a base 9 and clips 19 for fixing a second wavegide forming area 10b to the base 9 are provided. Furthermore, an optical fiber 23 and 24, which are aligned so that cores thereof are bonded to cores of the optical input waveguides 2 of the arrayed waveguide grating and of the optical output waveguides 6 of the same, respectively.

The feature of the first embodiment that differs from the proposed example as set forth is in that a thin film member 40 is disposed for covering the area arranged with the matching grease that is applied to crossed separation planes 8 and non-crossed separation planes 18. This thin film member 40 is configured to suppress the evaporation of the matching grease.

In the first embodiment, the thin film member 40 is Saran Wrap (trademark). As shown in FIG. 1, the thin film member 40 is wrapped around an arrayed waveguide grating chip twice so as to wrap the area arranged with the matching grease (a part where the matching grease is coated and the vicinity thereof).

In addition, the arrayed waveguide grating type optical multiplexer/demultiplexer of the first invention is fabricated by the same method as the method for fabricating the proposed example shown in FIGS. 3A and 3B (that is, the fabrication method proposed in Japanese Patent Application Nos. 370475/1999, 176691/2000, and 283806/2000). However, in the first embodiment, the arrayed waveguide grating type optical multiplexer/demultiplexer is fabricated in which a matching oil is not filled inside the package and the thin film member 40 is wrapped around the arrayed waveguide grating chip twice so as to wrap the area arranged with the matching grease that is coated on the crossed separation planes 8 and the non-crossed separation planes 18.

The arrayed waveguide grating type optical multiplexer/demultiplexer of the first invention is an arrayed waveguide grating type optical multiplexer/demultiplexer that can optically multiplexes and demultiplexes 16 waves with the 100 GHz frequency spacing. The FSR (Free Spectral Range) of the arrayed waveguide grating type optical multiplexer/demultiplexer of the first invention is 25.6 nm, the diffraction order m is 59, and the difference in length ΔL of the adjacent channel waveguides 4a is 63.1 $\mu$m at 25° C.

Furthermore, a focal lengths $L_f$ of both first and second slab waveguides 3 and 5 is 12327.06 $\mu$m, a pitch D of channel waveguides 4a is 20 $\mu$m, an effective refractive index $n_c$ of the arrayed waveguide 4 is 1.45115 with respect to the light having a wavelength of 1.55 $\mu$m, and a group refractive index $n_g$ of the arrayed waveguide 4 is 1.47512 with respect to the light having a wavelength of 1.55 $\mu$m. An effective refractive index $n_s$ of both the first and second slab waveguides 3 and 5 is 1.453 with respect to the light having a wavelength of 1.55 $\mu$m, and a center wavelength $\lambda_0$ of the arrayed waveguide grating is 1.551 $\mu$m.

The first embodiment is configured as set forth. In the first embodiment, the temperature dependency of the light transmission center wavelength is also compensated by the same operation as the proposed arrayed waveguide grating type optical multiplexer/demultiplexer. That is, in the arrayed waveguide grating type optical multiplexer/demultiplexer of the first invention, the temperature dependency of the light transmission center wavelength is compensated by the operation in which a slide moving member 17 moves a waveguide forming area 10a along the crossed separation planes 8 depending on temperatures.

Moreover, in the arrayed waveguide grating type optical multiplexer/demultiplexer of the first invention, the matching grease is applied to the crossed separation planes 8 and the non-crossed separation planes 18 and the thin film member 40 for covering the area arranged with the matching grease is disposed to suppress the evaporation of the matching grease. Accordingly, the arrayed waveguide grating type optical multiplexer/demultiplexer of the first embodiment can suppress an increase in insertion loss with a substantially simple configuration even under the environment of high temperature and high humidity.

In fact, the humidity test where the arrayed waveguide grating type optical multiplexer/demultiplexer of the first embodiment is allowed to stand for 336 hours under the environment of 85% relative humidity at 85° C. was conducted, and the insertion loss at the 1.55 $\mu$m band was measured before and after the humidity test. Consequently, the insertion loss of the arrayed waveguide grating type optical multiplexer/demultiplexer of the first embodiment was 4.5 dB before the humidity test and 4.7 dB after the humidity test; the insertion loss after the humidity test was almost the same as that before the humidity test.

In addition, according to the first embodiment, a simple package can be used to fabricate the arrayed waveguide grating type optical multiplexer/demultiplexer and thus an arrayed waveguide grating type optical multiplexer/demultiplexer of low costs can be made.

Figure 2:
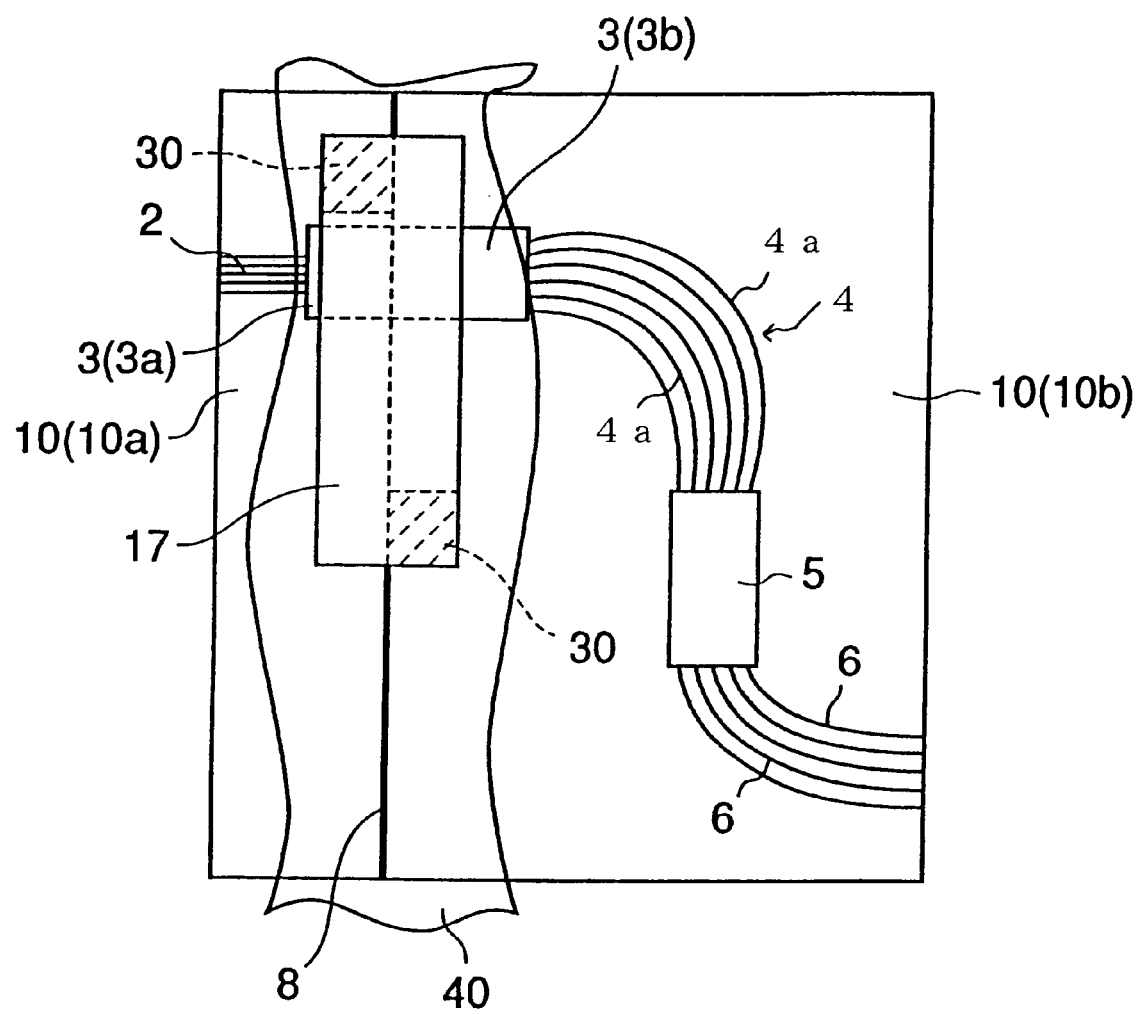
FIG. 2 is a main configurational diagram illustrating a second embodiment of the arrayed waveguide grating type optical multiplexer/demultiplexer in the invention.

FIG. 2 depicts an arrayed waveguide grating type optical multiplexer/demultiplexer of a second embodiment. The second embodiment is configured almost the same as the first embodiment described above. However, in the arrayed waveguide grating type optical multiplexer/demultiplexer of the second embodiment, crossed separation planes 8 separate a first waveguide forming area 10a and a second waveguide forming area 10b without forming the non-crossed separation planes 18. In addition, the second embodiment is formed in which a slide moving member 17 is disposed on the front surface side of the border region of the first and second waveguide forming area 10a and 10b.

Furthermore, in the second embodiment, solders 30 are disposed underside the slide moving member 17 at portions indicated by the shaded areas with diagonally dotted lines, and metal films (not shown) are disposed underside the solders 30 as well. Through the metal films and the solders 30, the slide moving member 17 is fixed to the portions for fixing on the first waveguide forming area 10a and the second waveguide forming area 10b.

Moreover, on the crossed separation planes 8, the matching grease is coated. In the second embodiment, a Teflon tape (Teflon sheet) is adapted as a thin film member 40 for covering the area arranged with the matching grease and this Teflon tape sandwiches an arrayed waveguide grating chip from the front and back sides thereof.

Besides, as not shown in the same drawing, a base 9 is disposed underside a substrate 1 of the arrayed waveguide grating and the second waveguide forming area 10b side is fixed to the base 9 by clips 19 as well in the second embodiment.

The second embodiment is configured as described above. The second embodiment also operates almost the same as the first embodiment mentioned above and can exert similar effects. In the second embodiment, the humidity test mentioned above was performed to obtain the insertion loss of the arrayed waveguide grating type optical multiplexer/demultiplexer. The insertion loss before the humidity test was 4.5 dB and the insertion loss after the humidity test was 4.8 dB. In the second embodiment, the increase in insertion loss after the humidity test could be suppressed, as similar to the first embodiment.

The invention is not limited to the embodiments described above and can adopt various embodiments. For example, in the first embodiment, Saran Wrap was applied as the thin film member 40 for covering the area arranged with the matching grease, and in the second embodiment, Teflon tape was applied as the thin film member 40. However, the configuration of the thin film member 40 is not defined specifically, which can be set arbitrarily. It may be a film or tape (sheet) that can suppress the evaporation of the matching oil and is excellent in thermal resistance and moisture resistance.

Additionally, in each of the embodiments, the copper plate was used as the slide moving member 17. However, the slide moving member 17 is not necessarily formed of copper, it may be formed of a metal member other than copper or a member having a greater coefficient of thermal expansion than that of the waveguide forming area 10 except metals.

Furthermore, in each of the embodiments, the slide moving member 17 was fixed to the waveguide forming area 10 through the metal films and the solders 30. However, not limiting to the metal films and the solders 30, the slide moving member 17 may be fixed to the waveguide forming area 10 using a thermo curable adhesive. For the member to fix the slide moving member 17 to the waveguide forming area 10, the member that can fix both will be acceptable.

Moreover, in each of the embodiments, the slide moving member 17 was disposed on the front side of the waveguide forming area 10. However, the slide moving member 17 may be disposed on the back side (the back side of the substrate 1 in each of the embodiments) of the waveguide forming area 10.

Besides, in each of the embodiments, the first slab waveguide 3 was separated. However, since the arrayed waveguide grating is formed by utilizing the reciprocity of optical circuits, the second slab waveguide 5 side may be separated. In this case, the slide moving member 17 slidably moves at least one side of the separated slab waveguides along the crossed separation planes 8 in the direction to reduce the temperature dependent variation of each of the light transmission center wavelengths. Accordingly, the same effects as each of the embodiments, and the temperature dependent variation of each of the light transmission center wavelengths can be eliminated.

In addition, the crossed separation planes 8 of the first slab waveguide 3 or second slab waveguide 5 are not limited to the planes almost parallel to the X-axis as the embodiments. The crossed separation planes 8 may be planes diagonal to the X-axis, which may be separated at the separation plane crossing the path of light passing through the separated slab waveguides.

Furthermore, in each of the embodiments, one optical input waveguide 2 was disposed in the waveguide configuration of the arrayed waveguide grating but a plurality of optical waveguides 2 may be disposed.

Moreover, in each of the embodiments, the separation planes of the crossed separation planes 8 and the non-crossed separation planes 18 were formed by cutting. However, these separation planes may be separation planes formed by other methods such as cleavage.

What is claimed is:

1. An arrayed waveguide grating type optical multiplexer/demultiplexer comprising:

one or more of optical input waveguides arranged side by side;

a first slab waveguide connected to the output ends of said optical input waveguides;

an arrayed waveguide made of a plurality of channel waveguides arranged side by side, the channel waveguides being connected to the output end of said first slab waveguide and the channel waveguides having a different set amount each other;

a second slab waveguide connected to the output end of said arrayed waveguide;

a plurality of optical output waveguides arranged side by side, the optical output waveguides connected to the output end of said second slab waveguide;

separation planes separating at least one of said first slab waveguide and second slab waveguide and crossing a path of light passing through the slab waveguide;

a slide moving member for slidably moving at least one side of said separated slab waveguides along said separation planes;

a refractive index matching agent arranged on said separation planes; and a thin film member for covering an area arranged with the refractive index matching agent.

* * * * *